July 3, 1962 C. E. FRINK 3,042,413

RECORDED ADAPTER FOR PHONOGRAPH RECORDS

Filed Dec. 27, 1960

*INVENTOR.*
CLAUDE E. FRINK
*BY*
Lloyd J. Andres 3,042,413
Patented July 3, 1962

3,042,413

RECORDED ADAPTER FOR PHONOGRAPH RECORDS

Claude E. Frink, 1790 NW. 83rd Terrace, Miami, Fla.

Filed Dec. 27, 1960, Ser. No. 78,656
1 Claim. (Cl. 274—42)

This invention relates in general to disc phonograph records and more particularly to a means for applying a supplementary recording to a standard disc recording.

It has been found desirable for the purposes of identification and advertisement to apply a supplemental recorded message to existing records and, since all standard records have a marginal lead-in space on their outer surfaces, a plastic ring adapted to be retained on the outer periphery of the record and extending over the lead-in margin provides a suitable space for retaining an auxiliary recording.

A principal feature of this invention is the provision of a ring having a recorded spiral groove on one side thereof which may be manually applied and frictionally retained on the outer periphery of a standard disc record.

A further object of the invention is the provision of a plastic ring having predetermined elasticity and dimensioned to be self secured on the outer edge of a standard disc record and covering the outer margin on one side of the record and including a spiral recorded groove on one side thereof.

These and other objects and advantages in one embodiment of the invention are described and shown in the appended specification and drawing in which.

Figure 1:
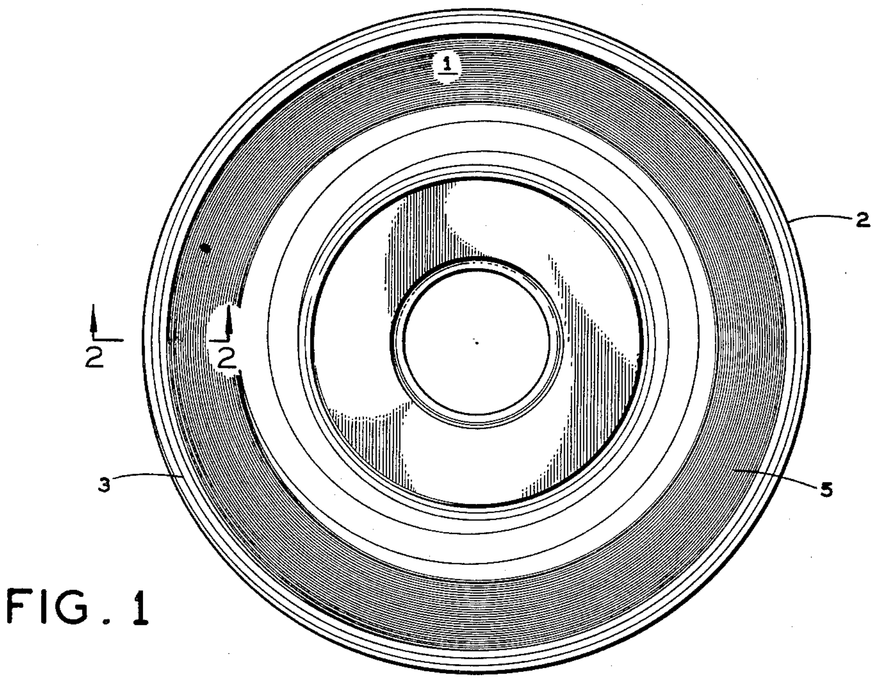
FIG. 1 illustrates a standard disc phonograph record on which a supplemental recorded adapter ring is secured.
Figure 2:
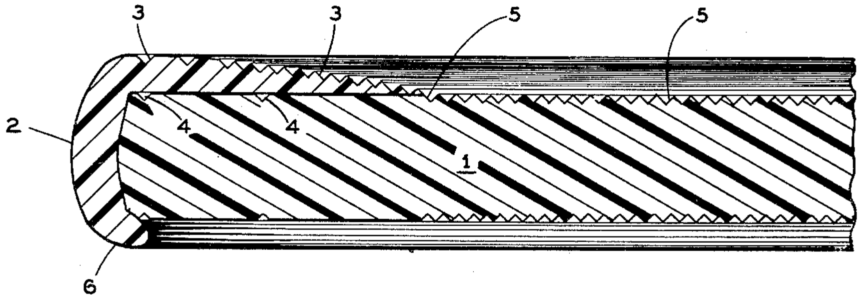
FIG. 2 is a greatly enlarged cross sectional view taken through section line 2—2 of FIG. 1.

Referring to FIG. 1, a standard disc record 1 is provided with a plastic ring 2 frictionally secured to the outer edge of the record 1 and having a spiral recorded groove 3 on a lip on one side thereof, better shown FIG. 2. The lip of the ring bearing the recording 3 is adapted to be positioned over the outer lead-in margin of the record which contains a standard lead-in groove 4 leading in to the sound recorded portion 5 of the groove.

The ring 2 is preferably made from a plastic material such as vinylite having predetermined elasticity and having a uniform cross section as shown with a channel around the inner periphery shaped to engage the outer edge of a standard record with a lip portion 6 for securely holding the ring on the record.

It is to be noted that the portion of the ring bearing the auxiliary groove 3 is sloped inward to a sharp edge joining the groove 5 thus permitting the stylus to freely transfer from playing recording 3 and begin the playing of recording 5 when the record is rotated.

It is now apparent that the pre-recorded rings 2 may be manually applied to standard disc records and provide predetermined introductory messages preceding the recording on any stardard disc record and may be readily removed for transfer to other records as required.

It is understood that modifications in construction retaining the features above described are intended to come within the scope of the appended claim.

Having described my invention, I claim:

A supplemental record adapter for a disc phonograph record comprising a circular member of uniform cross-section formed from plastic material of predetermined elasticity and having a channel around the inner periphery formed by an upper and a lower lip for frictional engagement with the outer edge portion of said record, said upper lip positioned over one outer margin of said record sloping downward in a radial direction toward the axis thereof and terminating at the recorded grove in said record a predetermined distance from the edge thereof, a spiral recorded groove in the outer surface of said upper lip for the initial playing thereof when said record is played, said second lip extending over the opposite outer margin of said record a predetermined distance for retaining said adapter on said record.

References Cited in the file of this patent

UNITED STATES PATENTS

| | | |
|---|---|---|
| 1,172,533 | Kane | Feb. 22, 1916 |
| 2,285,139 | Andres | June 2, 1942 |
| 2,287,240 | Haltenhof | June 23, 1942 |
| 2,318,654 | Wissner | May 11, 1943 |

FOREIGN PATENTS

| | | |
|---|---|---|
| 335,768 | Great Britain | Oct. 2, 1930 |
| 417,931 | Great Britain | Oct. 16, 1934 |
| 212,884 | Switzerland | Mar. 17, 1941 |
| 816,287 | Great Britain | July 8, 1959 |